Patented Aug. 7, 1951

2,562,934

UNITED STATES PATENT OFFICE 2,562,934

PROCESS OF ISOLATING LUPULON FROM HOP RESIN

Harold David Michener, Neva Snell, and Eugene F. Jansen, Berkeley, Calif., assignors to the United States of America as represented by the Secretary of Agriculture No Drawing. Application January 18, 1949, Serial No. 71,544

3 Claims. (Cl. 260—586)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

Lupulon is a constituent of hop resins and is valuable because of its antibiotic properties. It is normally associated with the amorphous, sticky, soft resin material of the hop resins, and its isolation therefrom has been difficult. This invention relates to such isolation and accomplishes this in a simple and efficient manner.

The hop resin utilized in this invention as the starting material hereinafter designated as "soft resin of hops" may be produced by known methods. The following indicates an expeditious method for its production.

1025 grams of dried, ground hop cones was extracted first with 6.6 liters and then with 2.7 liters of technical absolute methanol. The combined extracts, totaling 9 liters, was added to 15 liters of 2% aqueous sodium chloride. The resulting mixture was extracted successively with five 5-liter portions of petroleum ether. The combined petroleum ether extracts was evaporated under reduced pressure to obtain 123 g. of the soft resin of hops as a very viscous dark brown liquid.

In general, according to the invention, a crystalline fraction rich in lupulon is obtained. First, the soft resin of hops is stored to crystallize lupulon therein and the crystals are separated from the resin to produce an impure fraction. This fraction is then extracted with a hot aqueous alkanol, preferably methanol, having a concentration from about 65% to about 75%. This dissolves the lupulon present in the impure fraction. This lupulon is then separated from the extract, as by cooling to crystallize the lupulon and filtering the cooled extract.

Preferably, the soft resin of hops is cooled during storage to cause crystallization of the impure lupulon fraction, and this fraction is then separated by mixing with a resin solvent which is not a solvent for the lupulon to render the mass less viscous and filtering.

The following example exhibits the invention in greater detail:

EXAMPLE 123 grams of soft resin of hops was stored for about 12 hours at 2° C. At the end of this time it was noted that the resin contained crystalline material. The crystal-containing resin was warmed to room temperature, mixed with 50 ml. of petroleum ether, to render the mass less viscous, and filtered. 39 grams of impure lupulon crystals was retained on the filter.

Eight grams of the impure lupulon was refluxed briefly, with shaking, in 320 ml. of 70% methanol. The solution was filtered while hot and the clear filtrate stored about 12 hours at 2° C. At the end of this period, the liquid was filtered to obtain 2.25 grams of colorless lupulon crystals containing only a trace of resinous material.

The lupulon thus obtained was recrystallized from hot 70% methanol four times, in each case using about 60 ml. of the 70% methanol per gram of lupulon, dissolving the crystals in the methanol by refluxing, with shaking, for 2 to 5 minutes, filtering off undissolved material and storing the clear filtrate at 2° C. to promote crystallization. The final yield of lupulon was 1.34 grams. It had a melting point of 88 to 92° C. and had no optical rotation in benzene solution. Analysis: C, 74.3%; H, 9.02% (theoretical C, 75.3%; H, 9.24%). The lupulon thus obtained was tasteless and retained its appearance and biological activity after storage for several months in air at 2° C.

Changes in the process as described in the example are permissible. The time of storage and temperature to permit crystallization of the lupulon in both the soft resin of hops and the methanol extract may be varied, the lower temperatures accelerating the crystallization. Temperatures from about 2° C. to about 25° C. are preferred.

Other resin solvents which are not solvents for the lupulon, such as pentane, hexane, octane or mixtures of hydrocarbons like gasoline, benzine, kerosene, Stoddard solvent, and petroleum naphtha may be substituted for the petroleum ether and the amount used need be only such as to render the mass sufficiently mobile to filter easily.

Other water-soluble alkanols, such as ethanol, propanol, isopropanol, tertiary butanol, etc., may be substituted for the methanol as the extracting medium. Aqueous alkanol rather than absolute alkanol is used to reduce the solubility of the resins in the extract thus to obtain greater purity of the lupulon. Aqueous methanol solutions of from about 65% to about 75% concentration are very effective.

The soft resin of hops may be directly extracted with the hot aqueous alkanol and lupulon separated from the extract, thus omitting the preliminary separation of the impure lupulon fraction indicated above. Repeated extraction may be employed further to purify the lupulon, but the first extraction will result in a fraction sufficiently pure for many purposes. In this case the discard residue is a black substance with substantially no antibiotic activity and the extract contains a fraction rich in lupulon but containing also humulon and a yellow resinous material of unknown composition. This fraction, which has high antibiotic activity, is readily separated from the extract as by drying to evaporate the methanol and water.

The following table shows the antibiotic activity against certain fungi of a fraction thus obtained using 70% methanol as the extracting medium, the last column showing the low antibiotic activity of the black discard residue.

Table

| Test fungus | Concentration producing 50% inhibition of test organism, mg./liter | |
|---|---|---|
| | Fraction | Discard residue |
| Sclerotinia fructicola | 40 | Negligible. |
| Sclerotium bataticola | 40 | 1,800. |
| Rhizopus nigricans | 50 | 1,100. |
| Aspergillus oryzae | 240 | Negligible. |

Having thus described the invention, what is claimed is:

1. A process comprising storing soft resin of hops to crystallize lupulon therein, separating the crystals from the resin to produce an impure lupulon fraction, extracting the impure fraction with hot aqueous alkanol having a concentration from about 65% to about 75%, whereby to dissolve the lupulon present in said impure fraction, and separating lupulon from the extract.

2. The process of claim 1 wherein the alkanol is methanol.

3. A process comprising storing soft resin of hops to crystallize lupulon therein, adding a solvent for the resin which is not a solvent for the lupulon to render the mass less viscous, separating the impure crystalline lupulon therefrom, extracting the impure lupulon with a hot aqueous methanol of from about 65% to about 75% concentration, cooling the extract to crystallize lupulon therein, and separating the crystallized lupulon from the extract.

HAROLD DAVID MICHENER.
NEVA SNELL.
EUGENE F. JANSEN.

REFERENCES CITED

The following references are of record in the file of this patent:

Walker: J. Inst. Brewing, vol. 30, pages 570–578 and 712–724 (1924), vol. 31, pages 576–577 (1925).

Wollmer: Berichte, vol. 58B, pages 672–678 (1925).

Beyaert et al.; Govaert et al.; Chemical Abstracts, vol. 42, col. 7927 (1948).

Walker: J. Inst. Brewing, vol. 29, pages 379–399 (1923).

Cumming et al.: "Systematic Organic Chemistry," pages 8 to 11, D. Van Nostrand Co., New York, 1925.